US010706816B2

(12) United States Patent
Berlingerio et al.

(10) Patent No.: US 10,706,816 B2
(45) Date of Patent: Jul. 7, 2020

(54) IMPLEMENTING A FAULT TOLERANT COLOR PALETTE

(71) Applicant: INTERNATIONAL BUSINESS MACHINES CORPORATION, Armonk, NY (US)

(72) Inventors: Michele Berlingerio, Dublin (IE); Michele Gazzetti, Dublin (IE); Marco Luca Sbodio, Castaheany (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/153,170

(22) Filed: Oct. 5, 2018

(65) Prior Publication Data

US 2020/0111446 A1  Apr. 9, 2020

(51) Int. Cl.
| | |
|---|---|
| *G09G 5/06* | (2006.01) |
| *G06F 3/048* | (2013.01) |
| *H04N 1/60* | (2006.01) |
| *G06T 11/00* | (2006.01) |
| *G06F 3/0484* | (2013.01) |
| *G06F 3/0482* | (2013.01) |

(52) U.S. Cl.
CPC ............. *G09G 5/06* (2013.01); *G06F 3/0482* (2013.01); *G06F 3/04847* (2013.01); *G09G 2320/0666* (2013.01); *G09G 2354/00* (2013.01)

(58) Field of Classification Search
CPC combination set(s) only.
See application file for complete search history.

(56) References Cited

U.S. PATENT DOCUMENTS

| | | | |
|---|---|---|---|
| 8,345,338 B2 | 1/2013 | Jeong et al. | |
| 8,605,111 B2 | 12/2013 | Moon et al. | |
| 8,860,748 B2 | 10/2014 | Campbell et al. | |
| 9,563,972 B2 | 2/2017 | Allen et al. | |
| 9,659,032 B1* | 5/2017 | Dorner | H04N 1/644 |
| 9,727,983 B2 | 8/2017 | Dorner et al. | |
| 2003/0206206 A1* | 11/2003 | McCay | B41J 2/2132 |
| | | | 347/15 |
| 2015/0017612 A1 | 1/2015 | Uduehi | |
| 2015/0287345 A1 | 10/2015 | Tanuwidjaja | |
| 2015/0326839 A1 | 11/2015 | Wengierow et al. | |
| 2017/0119246 A1 | 5/2017 | Li | |
| 2017/0206677 A1 | 7/2017 | Dziuba | |
| 2018/0122103 A1 | 5/2018 | Chen et al. | |
| 2018/0158123 A1* | 6/2018 | Caruso | G06Q 30/0621 |

OTHER PUBLICATIONS

Troiano et al., "Adapting Palettes to Color Vision Deficiencies by Genetic Algorithm," GECCO'08, Jul. 12-16, 2008 (8 pages).
Kita et al., "Aesthetic Rating and Color Suggestion for Color Palettes," Pacific Graphics, vol. 35, No. 7, 2016 (10 pages).

(Continued)

*Primary Examiner* — Wesner Sajous
(74) *Attorney, Agent, or Firm* — Griffiths & Seaton PLLC

(57) ABSTRACT

Embodiments for implementing a fault tolerant color palette in a device having potential hardware faults by a processor. A fault tolerant color palette, assistive of user color interpretation for a display, may be generated according to a set of colors in a predetermined color palette and one or more user preferences.

17 Claims, 6 Drawing Sheets

(56) References Cited

OTHER PUBLICATIONS

Aytac, "Using Color Blindness Simulator During User Interface Development for Accelerator Control Room Applications," 16th International Conference on Accelerator and Large Experimental Control Systems, 2017 (6 pages).

Lau et al., "An Interactive App for Color Deficient Viewers," Color Imaging XX: Displaying, Processing, Hardcopy, and Applications, 2015 (9 pages).

* cited by examiner

IMPLEMENTING A FAULT TOLERANT COLOR PALETTE

BACKGROUND OF THE INVENTION

Field of the Invention

The present invention relates in general to computing systems, and more particularly to, various embodiments for implementing a fault tolerant color palette in a device having potential hardware faults in a computer in a computing environment.

Description of the Related Art

Computing systems may be found in the workplace, at home, or at school. Such computing systems may include fixed robot devices, such as within an automotive factory or production line. In this way, performance costs are controlled and maintained. Moreover, the computing systems can include an Internet of Things (IoT), which is the interconnection of computing devices scattered across the globe using the existing Internet infrastructure. IoT devices may be embedded in a variety of physical devices or products, such as home appliances, manufacturing devices, industrial printers, automobiles, thermostats, smart traffic lights, vehicles, buildings, etc.

SUMMARY OF THE INVENTION

Various embodiments for implementing a fault tolerant color palette in a device having potential hardware faults by one or more processors, are provided. In one embodiment, by way of example only, a method for implementing a fault tolerant color palette in a device having potential hardware faults in a device, again by a processor, is provided. A color palette, assistive of user color interpretation for a display, may be generated according to a set of colors in a predetermined color palette and one or more user preferences. The fault tolerant palette may be defined as any set of colors produced with the predetermined color palette distinguishable despite one or more colors missing from red, green, and blue ("RGB") color values. A color palette be defined as any set of colors produced with the predetermined color palette distinguishable by a user.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
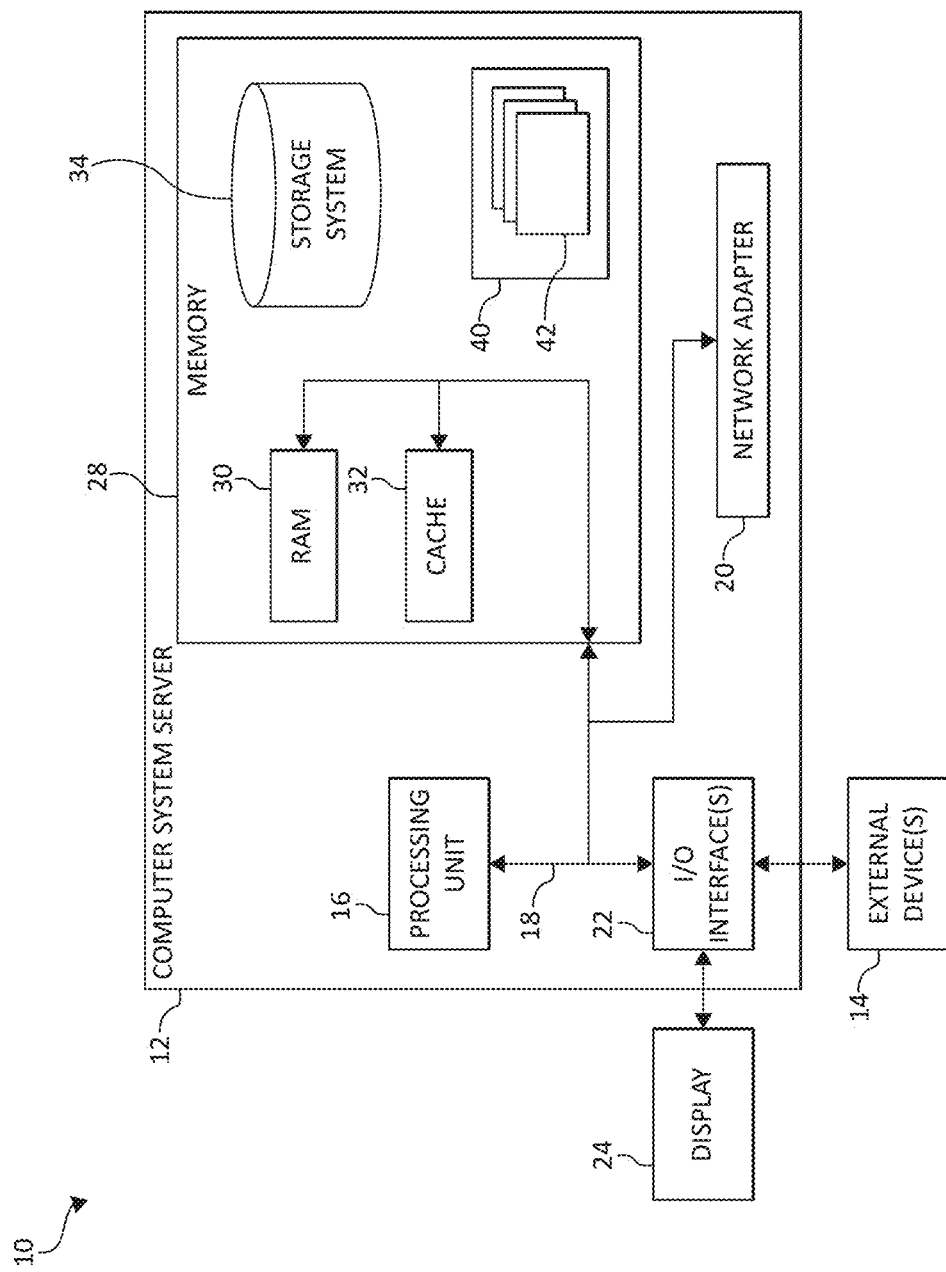
FIG. 1 is a block diagram depicting an exemplary cloud computing node according to an embodiment of the present invention.

Computer systems output data in either monochrome or color formats. In certain applications, the display of data in color has many advantages over the monochrome display of data. The use of color allows for easy identification of certain data on a display. For example, a red field could mean data entered incorrectly, whereas a green field could mean data entered correctly. The visible spectrum of color can be characterized as a three dimensional color space. Each of the visible spectrum can be characterized as a three-dimensional color vector in a color coordinate system, such as the RGB red-green-blue) system. Each color vector includes a color intensity value for each of the three color coordinates in the color coordinate system. In the RGB system, each color vector includes a color intensity value for each of the red, green, and blue color coordinates ("X, Y, and Z").

A set of colors may be a color palette that may contains 256 different colors. Each pixel in a color image may be represented by 24 bits, which can define 224 colors or more than 16.7 million different colors. Therefore, by replacing each color in a color image with one of the colors in a 256 color palette, each pixel in a color image can be represented by an 8 bit index into the color palette, rather than 24 bits of color information. Moreover, if the palette of colors are selected correctly and a unique palette is used for a particular image, in many cases the image quality is not significantly decreased.

In today's environment, a vast majority of computing systems/devices project and/or display of color images such as, for example, in television, games, computers and projection. For example, a, digital cinema or video projector may utilize colored light emitting diodes (LEDs) as the source of the primary colors for imaging. Often times, however, data may be displayed onto a display screen with a color component missing. As a result, projecting data onto the screen/projector, which may be faulty, the resulting images may be distorted or even cause a deficiency in viewing acuity of color. That is, some images displayed on a projection screen may cause the inability to discern the range of colors.

Accordingly, the present invention provides for implementing a fault tolerant color palette, again by a processor, is provided. A color palette, assistive of user color interpretation for a display, may be generated according to a set of colors in a predetermined color palette and one or more user preferences. The fault tolerant palette may be defined as any set of colors produced with the predetermined color palette distinguishable despite one or more colors missing from red, green, and blue ("RGB") color values. A color palette be defined as any set of colors produced with the predetermined color palette distinguishable by a user.

In one aspect, the fault tolerant color palette may be generated from any set of colors produced in a color palette distinguishable by a user despite one or more colors missing from red, green, and blue ("RGB") color values. Thus, the term "fault tolerant" (e.g., fault tolerant display) may be defined as any set of colors produced with the color palette distinguishable to a user despite one or more colors missing from red, green, and blue ("RGB") color values. The term "user color interpretation" may be defined as interpreting any set of colors produced with the color palette distinguishable by a user whether or not one or more colors missing from red, green, and blue ("RGB") color values.

Thus, the present invention provides for a fault tolerant color palette that enables color vision acuity across a range of colors, even if a hardware fault occurs causing one or more colors missing from the RGB color values. In this way, a user is enabled to identify reds, greens, and/or blues.

It should be noted that data is increasingly processed through a variety of geographically disbursed computing components, where, for example, a local node may contain a set of data processing components yet remain in remote communication with other portions of the distributed data processing system. To wit, a projector device and/or an IoT device's data may not be locally stored or processed on the user's local computer, but is instead hosted by one or more distributed storage components that are in remote communication with the local computer. This type of data storage may, in some cases, be referred to as "cloud," or "cloud-based" storage, in which one or more aspects of the present invention may be implemented.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
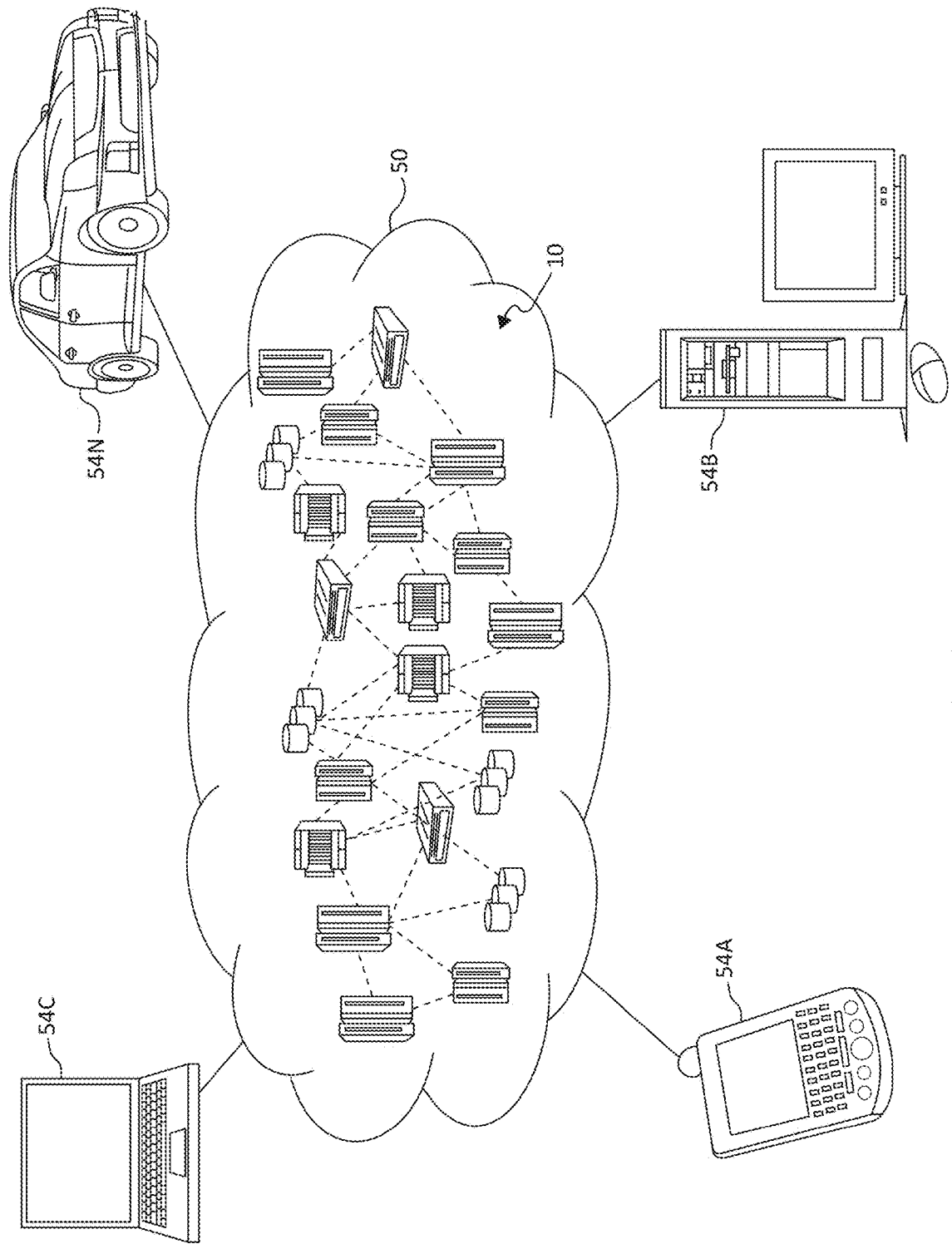
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
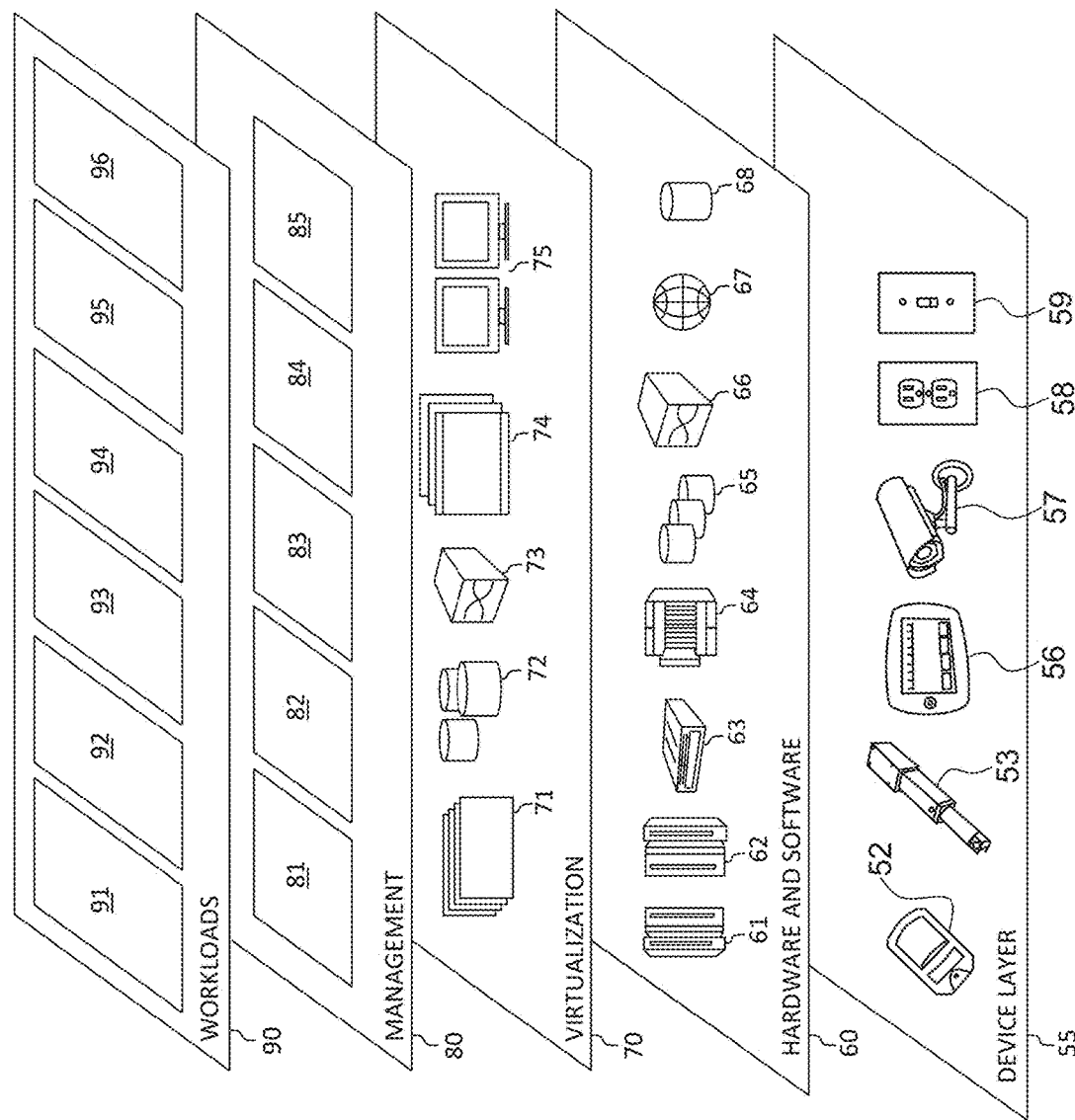
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for implementing fault tolerant color palettes in a device having potential hardware faults workloads and functions 96. In addition, workloads and functions 96 for implementing fault tolerant color palettes in a device having potential hardware faults may include such operations as data analysis (including data collection and processing from various environmental sensors), image analysis, task and device analysis, and/or data analytics functions. One of ordinary skill in the art will appreciate that the configuring settings for various computer-controlled devices using workloads and functions 96 for implementing fault tolerant color palettes in a device having potential hardware faults may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
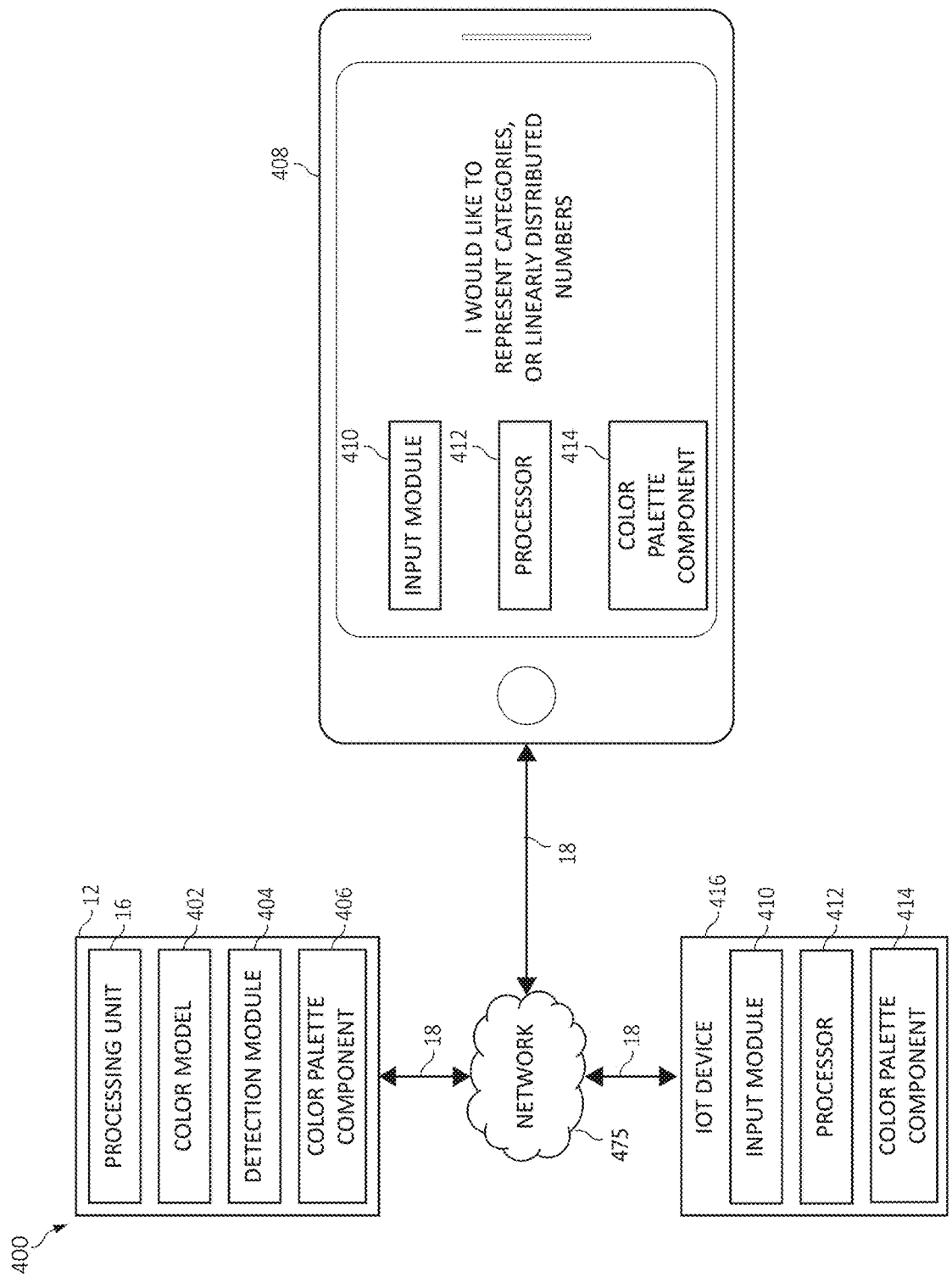
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, incorporating processing unit 16 to perform various computational, data processing and other functionality in accordance with various aspects of the present invention.

In one aspect, the color palette component 414 may be installed and/or included in the device 408 (and/or device 416). In an additional aspect, the device 408 may include a smart phone, video camera, a camera, a tablet, computers, handheld devices, other types of IoT devices and the like. The device 416, for example, may be a projector device having a light source for projecting/emitting an image and/or video media using the fault tolerant color palette.

The device 408 and device 416 may be connected via one or more communication channels 18 (e.g., bus 18) through the network to the computer system/server 12 as shown. In one exemplary embodiment, a presenter may find themselves in a location where they desire to use the device 416 for presenting a presentation using the fault tolerant color palette. The device 408 of the user may have already located, and connected to, a wireless network 475. The device 408 may then connect through the wireless network 475 through the Internet to the computer system/server 12 to provide the fault tolerant color palette and, in turn, receive settings information and/or instructions from the computer system/server 12.

The device 408 and device 416 may incorporate additional functional components 400 such as the depicted input module 410, processor 412, and color palette component 414. Here again, the use of an input module 410 and color palette component 414 are merely for illustrative convenience as a variety of functional components 400 may be integrated into the device 408 and device 416 to accomplish specific functionality to further the mechanisms of the illustrated embodiments.

Input module 410 may, in one embodiment, serve to receive a fault tolerant color palette information provided by the device 408 and device 416. For example, the input module 410 may receive input commands or selected data from color model 402 input into a touch screen or graphical user interface (GUI) to select and/or generate the fault tolerant color palette. For example, a menu option displaying a menu and/or list of a variety of colors via the GUI on the device 408 may be used to select the fault tolerant color safe palette for assisting user color interpretation of a set of colors produced in the color palette and also distinguishable for a user across a range of colors despite one or more colors missing from RGB color values.

The input module 410 may also receive a command to communicate the fault tolerant color palette to the computer system/server 12. A variety of input data may pass through the input module 410 to be processed by the computer system/server 12.

The color palette component 406 may determine, calculate, adjust, and/or calibrate the fault tolerant color palette of the presenter for display from a projector device, such as device 408 to device 416. The processing unit 16 may be in association with and/or control the display component 404 and the color palette component 406. A memory (not shown for illustrative convenience) may store data relating to the fault tolerant color palette and the color palette component 406.

A database of color models 402 is shown, along with a display module 404 and the color palette component 406. That is, various sets of colors may be received, identified and/or interpreted for the generating a fault tolerant color palette from various computer-controlled devices, which may be associated with the central server, the cloud computing network, the local area network server, and/or the computing system of the IoT devices including device 408 and/or 416.

The color palette component 412 may generate a color palette that is fault tolerant and color vision acuity safe for a projector or a display according to a set of colors in the color palette and one or more user preferences. The color palette component 412 may define the fault tolerant color palette as any set of colors produced with a predetermined color palette distinguishable despite one or more colors missing from red, green, and blue ("RGB") color values.

The color palette component 414 may define the fault tolerant color palette as any set of colors produced with the color palette distinguishable by a user regardless of the user's individual color vision acuity. The color palette component 414 may determine the set of colors that are a combination of the RGB color components. The color palette component 414 may determine the set of colors where there are no two colors having a same value for red ("R"), no two colors having a same value for green ("G"), and no two colors having a same value for blue ("B").

The color palette component 414 may select a set of K colors that maxims a hue, chroma, and a selected lightness. The color palette component 414 may select a set of colors having a minimum root mean square error (RMSE) with a gradient obtained by a linear interpolation from the set of colors. The display component 404 may display the generated color palette.

In an additional embodiment, the color palette component 414 may dynamically generate the fault tolerant color palette, assistive of user color interpretation for a display, according to a set of colors in a predetermined color palette and one or more user preferences. The color palette component 414 may adjust adjusting the fault tolerant color palette according to a determined set of colors, and/or dynamically adjust the fault tolerant color palette according to a determined set of colors in response to collected feedback data from one or more users, machine learning, or interactive reasoning with the one or more users.

For example, assume a presenter (e.g., a manager of a business) is using the display module 404 in a meeting that includes multiple persons (e.g., several employees) that have different types of color vision acuity (e.g., a user color interpretation of the display). The display module 404 may be configured and/or signaled to display the color palette according to a determined set of colors on all or portions of a presentation using the display module 404 to accommodate a color vision acuity (e.g., a user color interpretation of the display) for a select period of time (e.g., 10 seconds) and then dynamically adjust the color palette for a second or additional group of persons having a different type of color vision acuity. The set of colors produced in the color palette may distinguishable despite one or more colors missing from red, green, and blue ("RGB") color values. For example, the set of colors may be a combination of red, green, and blue ("RGB") color components for a selected group of viewers. The set of colors may then be adjusted, for example, for the second group of viewers where there are no two colors having a same value for red ("R"), no two colors having a same value for green ("G"), and no two colors having a same value for blue ("B").

Figure 5:
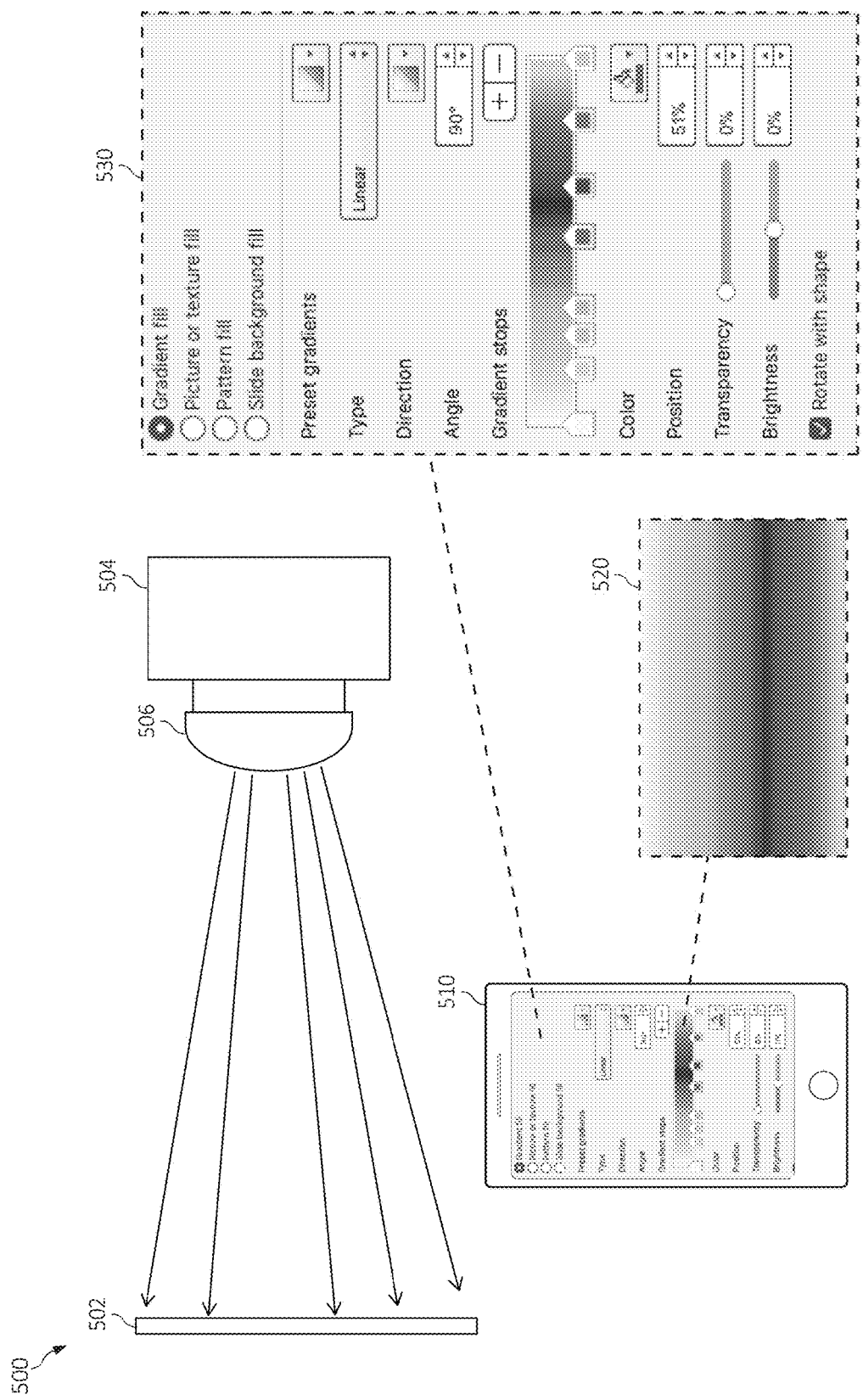
FIG. 5 is a diagram depicting a system for defining a function for creating a fault tolerant color palette in accordance with aspects of the present invention.

Turning now to FIG. 5, a diagram 500 for defining a function for creating a fault tolerant color palette in accordance with aspects of the present invention. In one aspect, each of the devices, components, modules, and/or functions described in FIGS. 1-4 may also apply to FIG. 5. Also, one or more of the operations and steps of FIGS. 1-4 may also be included in one or more operations or actions of FIG. 5.

FIG. 5 depicts a projector screen/display 502 and projector device 504 having a light source 506. The mechanisms of the embodiments provide a solution for prohibiting facial exposure to projected light from the light source 506 of the projector device 504 by one or more processors (see processor 16 of FIG. 1). Computer device 510 may be in communication with projector screen/display 502 and projector device 504 for displaying a fault tolerant color palette 520 (e.g., a fault tolerant color palette).

The computer device 510 depicts a GUI having a menu 530 that defines a function for creating the fault tolerant color palette 520. The menu 530 allows for 1) creating a fault tolerant and color vision deficiency color palette. The menu may be used to define and create a set of colors such that: a) each color is a combination of the three non-zero R,G,B components b) across all colors, there are no two identical R values, no two identical G values, and/or no two identical B values. The menu 530 provides for 2) selecting a set of k colors among the set of colors such that a) the selected set of colors maximizes a hue, a chroma and lightness distance between any two colors, and b) the selected set of colors maximizes the hue, chroma and lightness distance between any two colors such as, for example, any two colors used in a Ishihara test, which is a color perception test for red-green color deficiencies and consists of a number of colored plates each of which contains a circle of dots appearing randomized in color and sized.

Thus, a user may select from the menu 530 one or more colors for a use in a projector screen/display 502 and projector device 504. The selected colors from the menu 530 may be analyzed and manipulated/adjusted to generate the fault tolerant color palette 520, assistive of user color interpretation for the projector screen/display 502 and/or the projector device 504, according to a set of colors in a predetermined color palette and one or more user preferences. The chosen set of colors for the fault tolerant color palette 520 may be 1) a set of colors with the minimum RMSE with the resulting gradient obtained by linear interpolation of the visually-controlled set of colors, 2) a set of colors produced in a color palette distinguishable despite the potential hardware faults that include one or more colors missing from red, green, and blue ("RGB") color values, 3) any set of colors produced with a color palette distinguishable by a user, 4) a set of colors that are a combination of RGB color components, and/or 5) a set of colors where there are no two colors having a same value for red ("R"), no two colors having a same value for green ("G"), and no two colors having a same value for blue ("B").

Figure 6:
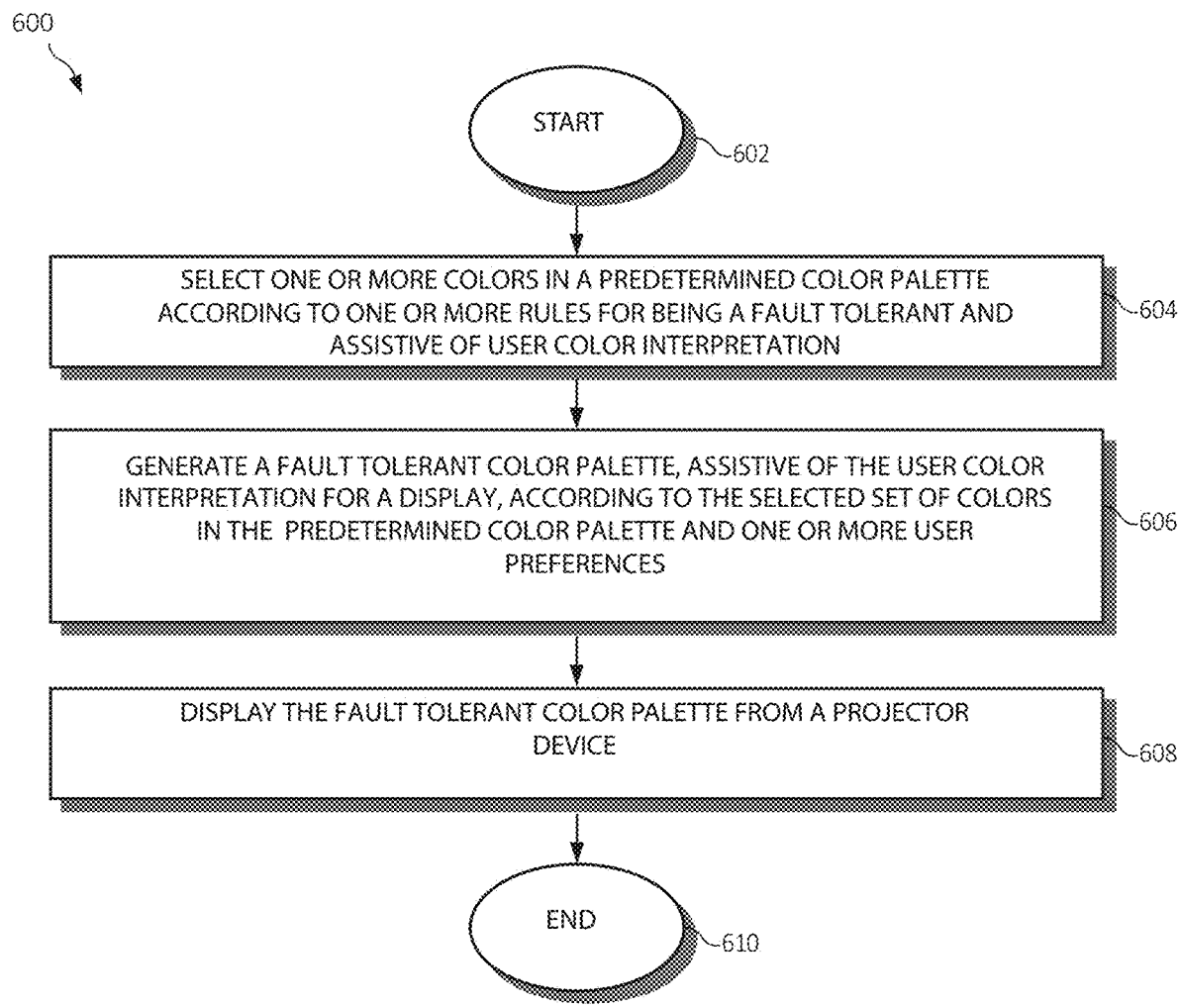
FIG. 6 is an additional flowchart diagram depicting an exemplary method for implementing a fault tolerant color palette in a device having potential hardware faults by a processor; again, in which aspects of the present invention may be realized.

Turning now to FIG. 6, a method 600 for implementing a fault tolerant color palette in a device having potential hardware faults by a processor is depicted. The functionality 600 may be implemented as a method executed as instructions on a machine, where the instructions are included on at least one computer readable medium or one non-transitory machine-readable storage medium. The functionality 600 may start in block 602.

One or more colors in a predetermined color palette may be selected according to one or more rules for being a fault tolerant and assistive of user color interpretation, as in block 604.

A fault tolerant color palette, assistive of user color interpretation for a display, may be generated according to a set of colors in a predetermined color palette and one or more user preferences, as in block 606. That is, a color palette may be generated that is fault tolerant and assistive of user color interpretation for a display according to a set of selected colors in the color palette (regardless of whether or not one or more colors are missing from red, green, and blue ("RGB") color value) and one or more user preferences. The fault tolerant color palette may then be displayed from a projector device, as in block 608. The functionality 600 may end in block 610.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for implementing a fault tolerant color palette in a device having potential hardware faults, comprising:
generating a fault tolerant color palette, assistive of user color interpretation for a display, according to a set of colors in a predetermined color palette and one or more user preferences; and
selecting a set of K colors that maximizes a hue, chroma, and a selected lightness, wherein K is a positive integer.

2. The method of claim 1, further including defining the fault tolerant color palette as any set of colors produced in a color palette distinguishable despite the potential hardware faults, wherein the potential hardware faults include one or more colors missing from red, green, and blue ("RGB") color values.

3. The method of claim 1, further including defining the fault tolerant color palette as any set of colors produced with a color palette distinguishable by a user.

4. The method of claim 1, further including:
determining the set of colors that are a combination of red, green, and blue ("RGB") color components; or
determining the set of colors where there are no two colors having a same value for red ("R"), no two colors having a same value for green ("G"), and no two colors having a same value for blue ("B").

5. The method of claim 1, further including selecting a set of colors having a minimum root mean square error (RMSE) with a gradient obtained by a linear interpolation from the set of colors.

6. The method of claim 1, further including:
dynamically adjusting the fault tolerant color palette according to a determined set of colors; or
dynamically adjusting the fault tolerant color palette according to a determined set of colors in response to collected feedback data from one or more users, machine learning, or interactive reasoning.

7. A system for implementing a fault tolerant color palette in a device having potential hardware faults, comprising:
one or more computers with executable instructions that when executed cause the system to:
generate a fault tolerant color palette, assistive of user color interpretation for a display, according to a set of colors in a predetermined color palette and one or more user preferences; and
select a set of K colors that maximizes a hue, chroma, and a selected lightness, wherein K is a positive integer.

8. The system of claim 7, wherein the executable instructions further define the fault tolerant color palette as any set of colors produced in a color palette distinguishable despite the potential hardware faults, wherein the potential hardware faults include one or more colors missing from red, green, and blue ("RGB") color values.

9. The system of claim 7, wherein the executable instructions further define the fault tolerant color palette as any set of colors produced with a color palette distinguishable by a user.

10. The system of claim 7, wherein the executable instructions further:
determine the set of colors that are a combination of the RGB color components; or
determine the set of colors where there are no two colors having a same value for red ("R"), no two colors having a same value for green ("G"), and no two colors having a same value for blue ("B").

11. The system of claim 7, wherein the executable instructions further select a set of colors having a minimum root mean square error (RMSE) with a gradient obtained by a linear interpolation from the set of colors.

12. The system of claim 7, wherein the executable instructions further:
dynamically adjust the fault tolerant color palette according to a determined set of colors; or
dynamically adjust the fault tolerant color palette according to a determined set of colors in response to collected feedback data from one or more users, machine learning, or interactive reasoning.

13. A computer program product for implementing a fault tolerant color palette in a device having potential hardware faults by a processor, the computer program product comprising a non-transitory computer-readable storage medium having computer-readable program code portions stored therein, the computer-readable program code portions comprising:
an executable portion that generates a fault tolerant color palette, assistive of user color interpretation for a display, according to a set of colors in a predetermined color palette and one or more user preferences; and
an executable portion that selects a set of K colors that maximizes a hue, chroma, and a selected lightness, wherein K is a positive integer.

14. The computer program product of claim 13, further including an executable portion that:
defines the fault tolerant color palette as any set of colors produced in a color palette distinguishable despite the potential hardware faults, wherein the potential hardware faults include one or more colors missing from red, green, and blue ("RGB") color values; and
defines fault tolerant color palette as any set of colors produced with a color palette distinguishable by a user.

15. The computer program product of claim 13, further including an executable portion that:
determines the set of colors that are a combination of the RGB color components;
determines the set of colors where there are no two colors having a same value for red ("R"), no two colors having a same value for green ("G"), and no two colors having a same value for blue ("B").

16. The computer program product of claim 13, further including an executable portion that selects a set of colors having a minimum root mean square error (RMSE) with a gradient obtained by a linear interpolation from the set of colors.

17. The computer program product of claim 13, further including an executable portion that:
dynamically adjusts the fault tolerant color palette according to a determined set of colors; or
dynamically adjusts the fault tolerant color palette according to a determined set of colors in response to collected feedback data from one or more users, machine learning, or interactive reasoning.

* * * * *